United States Patent [19]

Oftedal

[11] Patent Number: 4,973,203
[45] Date of Patent: Nov. 27, 1990

[54] PARTICULATE MATERIAL PICK-UP ASSEMBLY

[76] Inventor: Einar C. Oftedal, R.R. 1, Box 153, Cottonwood, Minn. 56229

[21] Appl. No.: 361,328

[22] Filed: Jun. 5, 1989

[51] Int. Cl.$^5$ .................................................. B65G 53/42
[52] U.S. Cl. ..................................... 406/152; 406/113; 406/194
[58] Field of Search ............... 406/152, 113, 109, 151, 406/194; 15/375, 420, 421

[56] References Cited

U.S. PATENT DOCUMENTS

| 2,744,792 | 5/1956 | Finn | 406/152 |
| 2,793,086 | 4/1957 | Jolley | 406/152 |
| 2,970,865 | 2/1961 | Finnegan | 406/152 |

FOREIGN PATENT DOCUMENTS

| 163314 | 7/1954 | Australia | 406/194 |
| 886270 | 10/1953 | Fed. Rep. of Germany | 406/113 |
| 8720 | 12/1955 | Fed. Rep. of Germany | 406/152 |
| 621351 | 2/1927 | France | 406/152 |

OTHER PUBLICATIONS

Brochure entitled "Neuero Pneumatic Grain Conveyors" by Neuero Corporation.
Brochure entitled "The New Standard of Excellence in Grain Vacs. by Vana" Industries Ltd.
Brochure entitled "Handlair 560 660, by Christianson Systems, Inc".

Primary Examiner—Joseph F. Peters, Jr.
Assistant Examiner—Anne E. Bidwell
Attorney, Agent, or Firm—Kinney & Lange

[57] ABSTRACT

A pick-up assembly for grain and other particulate material includes a particulate material pick-up head provided with an elongated narrow rectangular forwardly facing opening, a tubular discharge conduit extending rearward from the pick-up head, a main frame supporting the pick-up head and the discharge conduit rigidly with respect to each other, a pair of wheels rotatable on a single horizontal axis mounted to the frame at position toward the rear of the discharge conduit, and a handle rigidly mounted with respect to the frame to be behind and above the wheels. A ground supported flexible hose extends from the rear of the discharge conduit to a pneumatic grain conveyor.

14 Claims, 4 Drawing Sheets

Fig. 7
PRIOR ART

PARTICULATE MATERIAL PICK-UP ASSEMBLY

BACKGROUND OF THE INVENTION

1. Field of the Invention

This invention has relation to the use of pneumatic particulate material conveyors used to convey grain from and to storage bins, silos, grain trucks, railroad grain cars, and the like. Specifically, it relates to a pick-up assembly for air entraining piles of such materials resting on generally horizontal surfaces and in cleaning the residue of such particulate materials from such bins, silos, trucks, cars and the like.

2. Description of the Prior Art

It is known to convey grain and other particulate material by pneumatic means. For example, Neuero Corporation sells ship unloaders; seed handling pneumatic grain conveyors Models 660, 8110D and 210; and others. Vana Industries Ltd. sells CONVEYAIR brand grain vacuums Models 1955, 2955, 3005, 4005 and others. Christianson Systems, Inc. sells HANDLAIR brand pneumatic conveyors Models 560, 660 and others.

A major advantage of such pneumatic conveying system is to move grain or other particulate material without stirring up dust as is the case when grain augers and the like are used.

In accordance with the prior pneumatic conveying art, elongated solid conduits having open ends are attached to flexible hoses to pick up and convey the particulate materials. These conduits customarily included a bend therein to allow an operator to support a conduit from shoulder straps so as to carry it and whatever forward pick-up attachment was provided. The operator had to also support the weight of the grain flowing through the conduit as the conduit was moved around the area to be cleaned of grain. Such equipment has the further very substantial disadvantage that the pick-up ends of such conduits have customarily been positioned in direction so that they are sucked down toward the floor. This requires the operator to expend the added energy to keep the pick-up ends or heads from being sucked into contact with the floor cutting off material flow. End rollers have been provided to try to keep such heads up off of the floor, but these rollers are of no effect when it becomes necessary or desirable to pick up material from a higher portion of a pile. The downward draft resulting from flow into such pick-up heads must still be resisted by the operator.

It is known to remove leaves from lawns and to clean factory aisles, sidewalks and the like with large vacuum cleaners. For example, U.S. Pat. No. 3,491,399 granted in January of 1970 of Dolan et al shows such a device having a pick-up arrangement supported on rollers to run at different fixed distances with respect to the ground. Where large light litter such as crumpled paper, for example, is encountered, Dolan provides means for opening a flap on the front of his pick-up arrangement, and raising the front of such arrangement farther off of the ground to accommodate such trash. Then, in order to get full and thorough pick-up from the ground, the flap is closed, and the pick-up arrangement is once again lowered into very close proximity to the ground. This is clearly shown in FIGS. 2 and 3 of the Dolan patent.

Perhaps the original idea of collecting dust and conveying it into a "dust collecting machine" is shown in the ancient patent to Agan, U.S. Pat. No. 862,369, granted in August of 1907, where a head is mounted on rollers very close to the floor, and a very narrow opening is provided to draw in air right off of the floor, holding the head tightly down against that surface.

The patent to Hyams, U.S. Pat. No. 4,366,594, granted in January of 1983, shows a vacuum-operated debris collector including a mobile frame and a collection receptacle and impeller unit assembly mounted on the frame. From FIG. 2 of that patent, it appears that the suction head 114 is to be guided for movement over the ground by a handle 116, and that the reduction of pressure in the head tends to pull the head directly into the ground. There is no provision for helping the operator handle this suction head other than by main force.

FIG. 5 of the Hyams patent discloses "a different form of section (sic) head which may be employed with the equipment." In the specification, column 4, beginning at line 37, it is pointed out that: "A relatively small suction head, such as that illustrated in FIG. 5 at 132, would provide a relatively concentrated vacuum for use in hard to clear places, where space limitations are severe." Such a "relatively small suction head" providing "relatively concentrated vacuum" would, indeed, pick up everything in its path, including, for example, not only low density particulate materials, but also sticks and stones, nails, and bolts, etc.

Another downwardly facing "surface cleaning tool" is shown in the patent to Duff, U.S. Pat. No. 2,850,757, granted in September of 1958. Like the other patents of the prior art cited herein, this downwardly facing structure would not allow sufficient space for the free flow of particulate materials into the pneumatic conveyor to be effective in the present context Similarly, the design patent to Wiese et al, U.S. Pat. No. 277,517, granted in February of 1985, shows another downwardly facing hood design with rollers and wheels to support the pick-up apparatus in such a manner that it would not be effective in the present context.

The foregoing patents were cited in a search of the prior art. Applicant and those in privity with him are aware of no prior art closer than that discussed above and are aware of no prior art which anticipates the claims set out herein.

SUMMARY OF THE INVENTION

A particulate material pick-up assembly of the present invention is for use with a pneumatic particulate material conveyor having an open-ended air and material acquisition conduit, a material delivery and air dispersing spout means, and means between these two elements for continuously lowering the air pressure in the acquisition conduit to cause air to entrain particulate materials and to cause such materials to discharge from and such air to be dispersed from the dispersing spout means.

The pick-up assembly itself includes an imperforate material pick-up head providing at a forward end thereof a horizontally extending, elongate, generally rectangular and forwardly facing particulate material pick-up forward opening and providing at a rearward end thereof a rearward material discharge opening. The pick-up assembly also includes a rigid, hollow, tubular pickup assembly discharge conduit having a first forward end open to and in sealing relationship with the pick-up head discharge opening and a second rearward end in concentric alignment with the first end. A wheel supported main frame rigidly supports the pick-up head and pick-up assembly discharge conduit with respect to each other. Wheel means are rotatably mounted with respect to the main frame to support the remainder of the pick-up assembly to pivot on a ground- supported, horizontal axis lying in normal relation to said first vertical plane and adjacent a rearward end portion of the discharge conduit.

A manually manipulable handle for pivoting the pick-up assembly about the horizontal wheel axis and for propelling the assembly on the wheel means is rigidly connected to the main frame to have position rearwardly of and above the wheel axis.

The pick-up assembly includes also a ground-supported material carrying flexible hose extending between the discharge conduit rearward open end and the material conveyor acquisition conduit.

DETAILED DESCRIPTION OF THE PREFERRED EMBODIMENT

Figure 1:
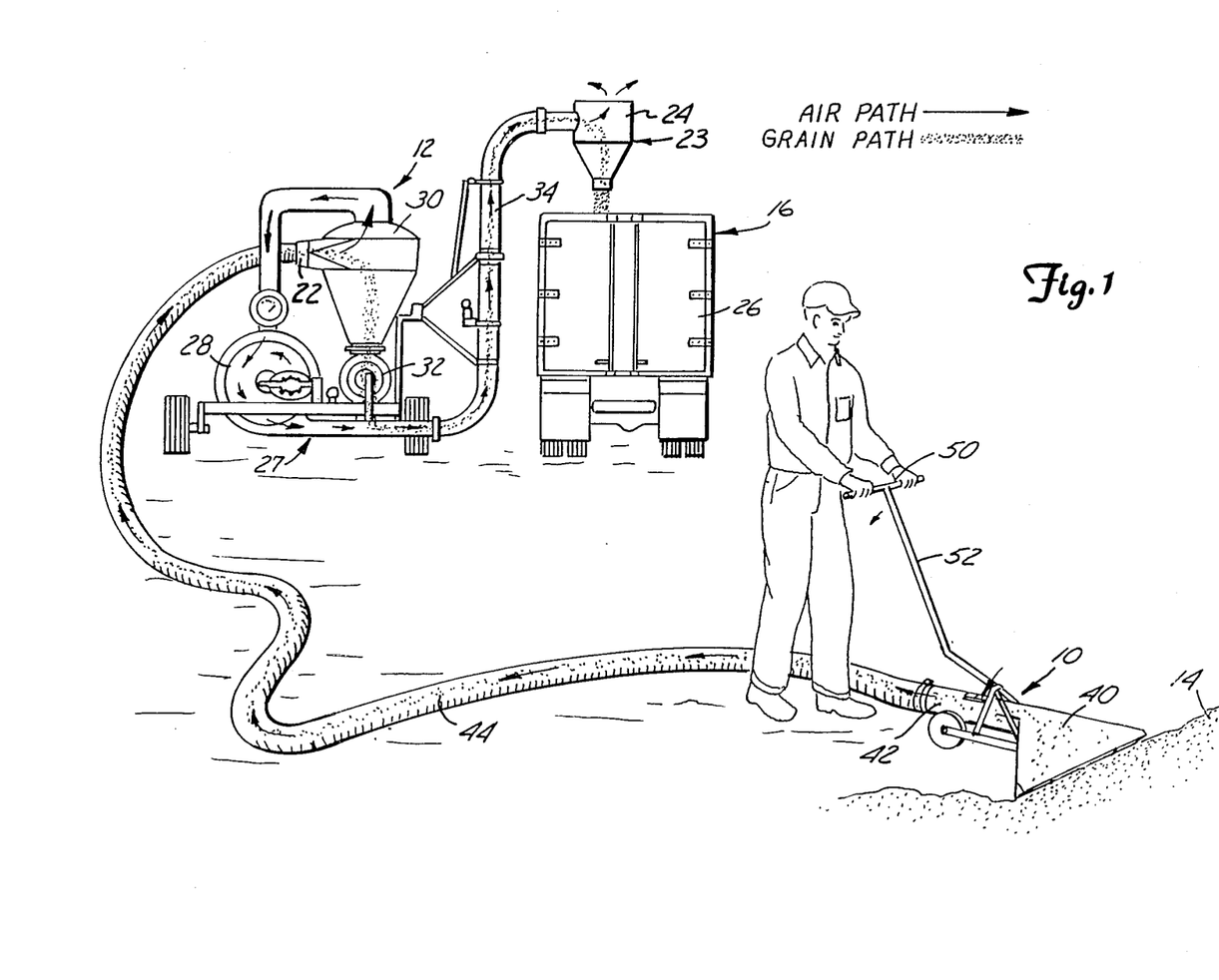
FIG. 1 is a combined perspective and schematic general assembly drawing showing the particulate material pick-up assembly of the present invention being manually used to convey a pile of particulate material such as corn, for example, to and through a pneumatic particulate material conveyor to a storage container.

A particulate material pick-up assembly 10 is used in connection with a pneumatic particulate material conveyor 12 to convey the contents of a pile of particulate material 14 to transport or storage areas 16. In the form of the invention as shown, the particulate material such as shelled corn is being conveyed from the ground or cement platform or deck into a truck.

However, the term "particulate material" or "material" is used herein to refer to many different kinds of granular materials, discrete particles, pellets, dust particles, and, in fact, any free flowing material. Included are seed grains, wheat, barley, oats, corn, soybeans, sunflower seeds, flax, lentils, rice, herbicide and plastic pellets. The pick-up assembly 10 of the present invention will work effectively with pneumatic particulate material conveyors of many different designs. The conveyor 12 shown herein forms no part of the present invention per se and is substantially the same as is manufactured and sold by Neuero Corporation of 1201 Hawthorn Lane, West Chicago, Ill. 60185 and identified as their Model 8110. This is similar to the conveyor sold by Vana Industries Ltd. of 92 DeBaets Street, Winnipeg, Manitoba, Canada R2J 3S9, identified as their Model 4005, for example. Also similar is the conveyor sold by Christianson Systems, Inc. of Blomkest, Minn. 56216 as their Model 560.

As stated by Vana Industries, such pneumatic conveyors cushion incoming grain (or other particulate materials) on a bed of rapidly moving air and quickly but gently push it into any container. Independent studies conducted by a major seed company proved pneumatic systems cause less costly grain damage than conventional augers. In order to further reduce damage to grain, corn or other particular materials, the pick-up assembly 10 allows for smooth straight flowthrough from pick-up point to the material conveyor.

As shown, the material conveyor 12, forming no part of the present invention per se, includes an open-ended ambient air and material acquisition conduit 22 and a material delivery and air dispersing spout means 23, shown herein as an open top, funnel-shape spout 24 dispersing air upwardly and delivering particulate material to a grain transport truck 26.

The means for continuously lowering the air pressure in the acquisition conduit 22 includes a blower air pump 28 which draws air out of the top of a cyclone separator 30 reducing the air pressure at the air and particulate material acquisition conduit 22. This causes the ambient air and the particulate material from the pile 14 to be drawn by that air into the particulate material pick-up assembly 10 and delivered through the conduit 22 into the cyclone separator 30 where it falls to the bottom and is discharged from the separator through an air lock 32 into a conveyor material discharge pipe 34 where it is again entrained by the air from the output side of blower air pump 28 to pass into the material delivery and air dispersing spout 24.

The particulate material pick-up assembly 10 itself includes an imperforate particulate material pick-up head 40; a rigid, hollow, cylindrical, nominally generally horizontally disposed pick-up assembly discharge conduit 42 open to the pick-up head 40; and a ground supported, particulate material carrying flexible hose 44 providing a smooth, gentle, flow path for air entrained particulate material from the discharge end of the discharge conduit 42 to the open end of acquisition conduit 22. The longitudinal axis of conduit 42 is coincident with the longitudinal axis of the pick-up head 40 and forms the longitudinal axis pick-up assembly 10 all of which are designated 66.

Pick-up assembly 10 also includes a wheel supported main frame 46 supporting pick-up head 40 and discharge conduit 42 in rigid relation with respect to each other. This frame is supported by a pair of wheels 48, 48 at the rearward end of frame 46, the wheels being mounted on spaced-apart axles having a common axis 49 and, as best seen in FIGS. 3 and 4, in position to support the rearward end of discharge conduit 42 and the forward end of flexible hose 44 to be in spaced relationship to the ground when the forward end of the pick-up head 40 is resting on the ground.

As seen in FIG. 1, a manually manipulable handle 50 is connected to the main frame 46 by a handle support means 52 in the form of a handle support rod or shaft 54 extending from the main frame 46 to the handle 50.

The material pick-up head 40 includes a horizontally extending, relatively long, bottom ground engageable pick-up head plate 56, a pair of upright, relatively short, pick-up head side plates 58, 58 extending upwardly from opposite edges of the bottom plate 56, and the top plate 60 having a leading edge in substantially parallel, spaced-apart relation to the horizontal leading edge of the bottom plate and connected at its side edges to each of the side plates 58, 58.

Figure 2:
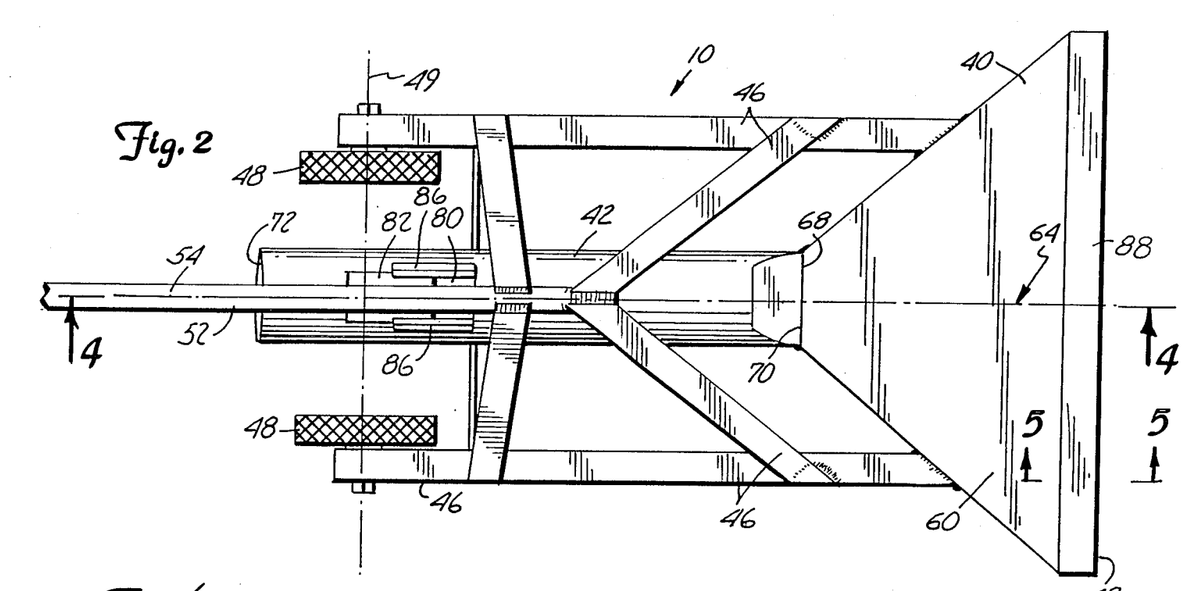
FIG. 2 is a top plan view of the material pick-up assembly of FIG. 1.
Figures 3, 4:
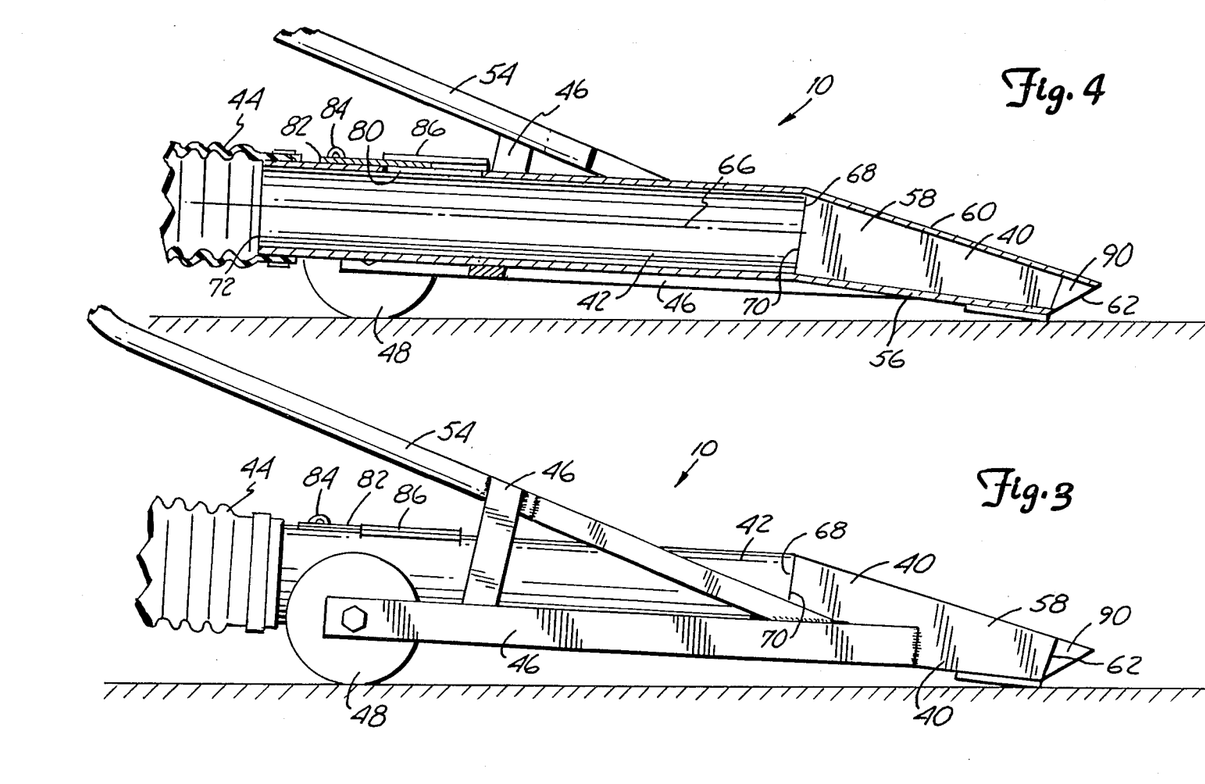
FIG. 3 is a side elevational view of the pick-up assembly as seen in FIG. 2 including a fragment of a particulate material carrying flexible hose not shown in FIG. 2.
FIG. 4 is a vertical sectional view taken on the line 4—4 in FIG. 2.

As seen in FIGS. 1–4, the leading edges of the bottom plate 56, the side plates 58, 58 and the top plate 60 define a horizontally extending, elongate, generally rectangular particulate material pick-up head forward opening 62 of the pick-up head 40, this opening defining a flat plane lying at right angles to, or in normal relationship to, a vertical plane 64 which includes the longitudinal axis 66 of the cylindrical pick-up assembly discharge conduit 42. These bottom, top and side plates extend rearwardly from this rectangular opening 62 to form a circular rearward material discharge opening 68. As seen in FIGS. 2 and perhaps as best seen in FIG. 4, this discharge opening 68 of the pick-up head 40 also lies in a plane perpendicular or normal to the vertical plane 64 including discharge conduit axis 66. In the form of the invention as shown, this opening 68 is integral with and open to a first forward open end 70 of the pick-up assembly discharge conduit 42. Conduit 42 is also provided with a second rearward open end 72 to which the ground supported flexible hose 44 is attached in any usual or preferred manner.

As shown, the horizontal length of the pick-up head forward opening is relatively long and the vertical height of that opening is relatively short. Satisfactory results can be obtained when the length is not less than ten times that of the height.

Whether cleaning out a grain bin or silo, or picking up spilled corn on an asphalt street, with the pneumatic conveyor 12 in operation, the operator will use the handle 50 to move the pick-up head 40 of the pick-up assembly 10 into a pile of grain, corn or other particulate material 14 as seen in FIG. 1, for example. The flow of air due to the difference between atmospheric pressure and the pressure reduction caused by air pump 28 will cause air to rush through the narrow rectangular forward opening 62 of the pick-up head, carrying individual particles of material with it. Each of these particles will then continue to be air entrained until it passes into the conduit 22 of the conveyor 12 and, from there, will move as set out above.

The power of the pneumatic conveyor 12 is such that material can be picked up at a rate so that the pick-up head 40, the discharge conduit 42, and the hose 44 are substantially filled with particulate. The weight of this particulate can be substantial, and a distinct advantage of the present invention is that the operator need not carry any substantial portion of this weight for any substantial period. For example, at early stages it may be advantageous to lift the leading edge of the pick-up head off of the ground, in order to "attack" the pile so that flow of material is substantially uniform over the entire area of the rectangular forward opening 62. This will have the advantages of eliminating the drag of individual particles over the ground, cement or asphalt platform surface or wooden, metal or dirt floor of a grain bin, for example.

As clearly seen in FIG. 1, and as is evident from a consideration of the positioning of handle support rod or shaft 54 in FIGS. 2, 3 and 4, the handle 50 is situated substantially behind the pivot point or axis 49 of the wheels 48, 48. With the weight of material in the pick-up head 40 and in the discharge conduit 42 forward of the axis 49 more or less balanced off by the weight of material in the discharge conduit 42 rearwardly of axis 49 and in the forward portion of the flexible hose 44 which is not actually supported on the ground, the operator has a relatively easy job to push down on the handle 50 to cause the leading edge of the pick-up head to be raised off of the ground level.

The operator can then move ahead either with the leading edge of the bottom plate 56 in contact with the ground (perhaps the usual situation) or with the bottom edge in spaced relation to the ground. In this manner, he can easily manipulate the pick-up assembly 10 so as to pick up every last one of the grains of material.

Figure 7:
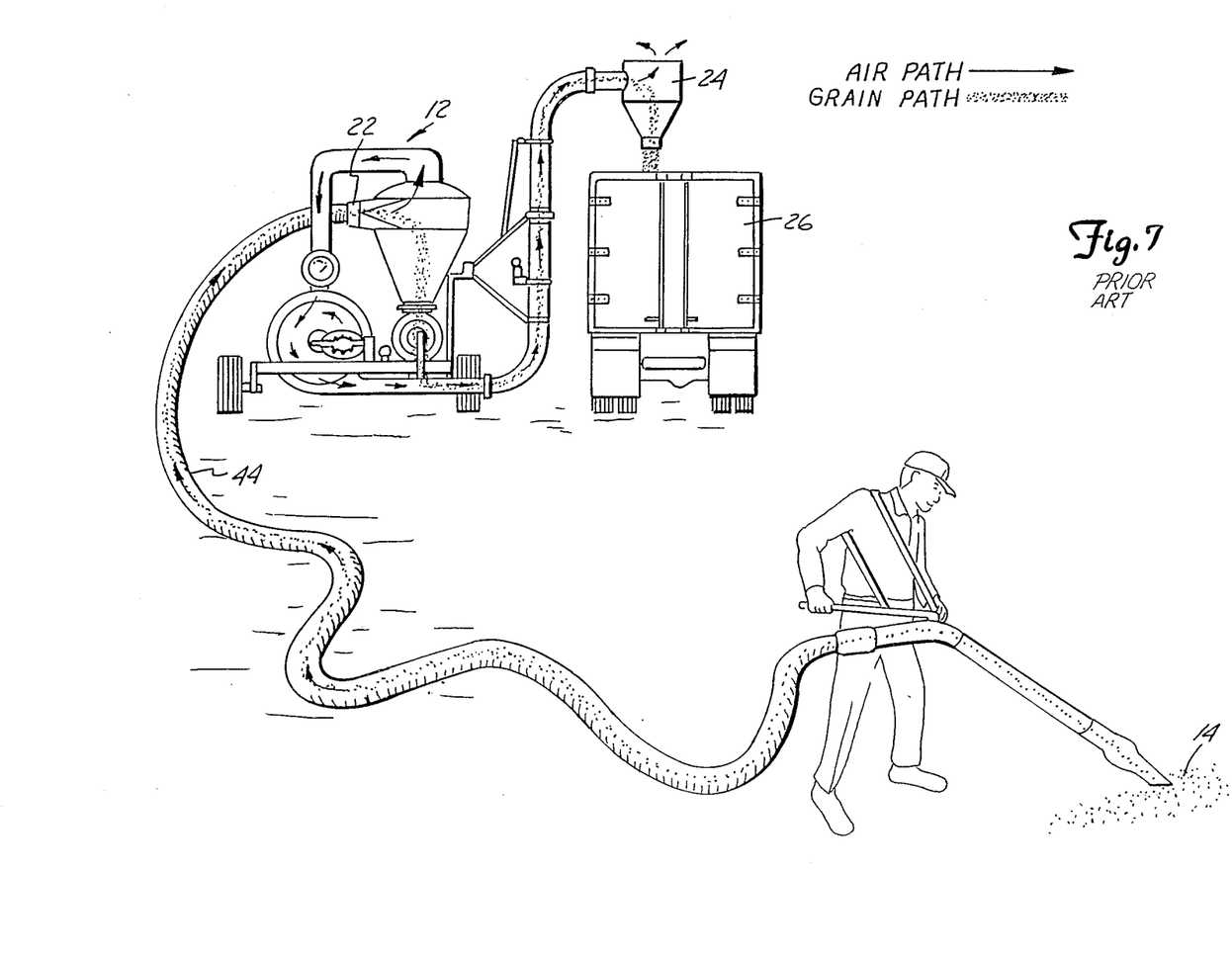
FIG. 7 is a similar view to that of FIG. 1 but showing, instead of the pick-up assembly of the present invention, a prior art manually supported and manipulated particulate material pick-up arrangement.

This eliminates the necessity of the operator having to bear the physical weight of the grain being picked up. In FIG. 7, see the shoulder harness and straps of the prior art being used to support the weight of the pick-up apparatus and of the grain in that apparatus. Also FIG. 7 shows abrupt bends raising the grain up an inlet tube to at least waist height, and then causing it to slam back down again to reach the level of the ground. This is eliminated by the relatively straight flow path through the apparatus of the present invention.

Figure 5:
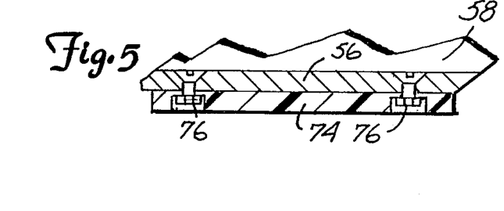
FIG. 5 is an enlarged fragmentary vertical sectional view of the lower forward tip of the bottom leading edge portions of a material pick-up head of the pick-up assembly taken on line 5—5 in FIG. 2.

Because the leading edge portion of the ground engaging bottom plate 56 is often in contact with the ground or whatever floor carries the material to be conveyed, this leading edge can include a wear plate 74 of any suitable wear resistant material. As seen in FIG. 5, this wear plate can be readily replaced through the instrumentality of the fastening means such as nut and bolt assemblies 76, 76.

Even in the form of the present invention as shown, it is possible, in some instances, for the operator to move ahead so rapidly that particulate material will enter the pick-up assembly 10 in such quantity that sufficient volume of air to keep it entrained cannot pass. The assembly and the flexible hose 44 can then become jammed or blocked. To reduce or eliminate the chances of this happening, a closeable air access opening 80 is provided through an upper surface of the pick-up assembly discharge conduit 42. See FIG. 4. A slide plate 82 provided with an appropriate handle 84 is slidably mounted in provided tracks 86 mounted on either side of the air access opening 80. See FIGS. 2, 3 and 4. By having at least some air entering at all times through the air access opening 80, the chances of a blockage from that opening to the pneumatic conveyor acquisition conduit 22 can be greatly reduced if not completely eliminated.

When particulate materials of relatively higher density are to be conveyed, the slide plate 82 will be moved to close off more of the air access opening 80, and the pick-up assembly will be manipulated to encounter less of the heavier particulate materials per minute; and when materials of relatively lesser density are to be conveyed, the air access opening 80 can be enlarged again and the pick-up assembly 10 can be manipulated to encounter more volume of materials per minute.

Figure 6:
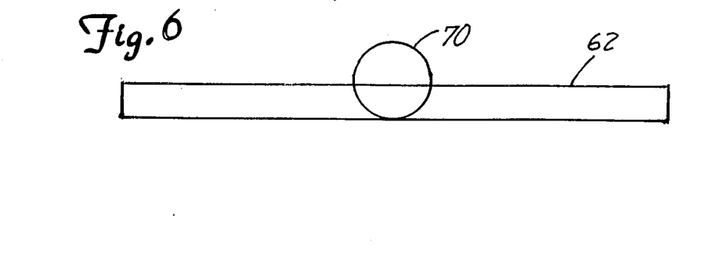
FIG. 6 is a schematic or graphic representation of the minimum area available for material flow adjacent the leading edges of the pick-up head in comparison to the area available for material flow adjacent the rear end of a discharge conduit integrally connected to the pick-up head.

As best seen in FIG. 4, the pick-up head top plate 60 diverges rearwardly away from the bottom plate 56 while the side plates converge toward each other from the leading edge toward the rearward discharge opening 68 of the head. To compare the cross sectional area of the forward opening 62 and the rearward opening 68 of the pick-up head 40 available to carry air entrained particulate material back toward the pneumatic conveyor, a schematic or graphic comparison is seen in FIG. 6. An outline of the minimum dimension of the rectangular forward opening 62 of the pick-up head 40 taken at right angles or normal to the leading edge of the ground engaging bottom plate 56 is shown overlaid on an outline of the minimum inner diameter of the circular rearward material discharge opening 68 of the pick-up head. This circular diameter is the same diameter as that of the forward open end opening 70 of the pick-up assembly discharge conduit 42 and of the rearward open end 72 thereof. As seen in FIG. 6, there is a considerable difference in the cross sectional areas available for carrying air entrained particulate material. The minimum flat plate area of the rectangular opening 62 is substantially larger than the area of the circular openings including the rearward discharge opening 68 of the pick-up head.

In actual practice, a forward opening 62 which is 16" long and 1" high has been found to work very effectively with circular openings 68, 70 and 72 which are four inches in diameter; and rectangular openings 62 which are 24" long and 1.5" high will work very well with openings 68, 70 and 72 which are five inches in diameter, and with the effective inner diameter of the flexible hose also being of five inches in diameter. Effective results can be obtained where the area of the rectangular opening 62 is substantially larger by 125% to 200% than the area of the circular discharge opening 68.

With the larger opening at the leading edge of the pick-up head, the speed of flow of air and particulate material at that opening will be less than the speed of air and air entrained materials exiting the pick-up head. This also means that the force of the entraining air entering the leading edge of the pick-up head will be less than the force of the entraining air as it reaches it constant speed after passing through the rearward material discharge opening 68. The advantage to this construction has to do with the fact that the particulate materials for which the pick-up assembly 10 is designed to handle are generally less dense than deleterious materials which may find their way into the path of the pick-up head. For example, bits of metal such as parts of nails, screws, nuts and bolts, and bits of rock or even grains of sand are much denser than kernels of wheat, barley, corn, etc., etc. Therefore, these particulate materials which the pick-up assembly is designed to entrain for handling by the pneumatic conveyor are easily carried into the pick-up head through the larger rectangular opening, while denser deleterious materials are left on the supporting surface, or are dropped to the area below the pick-up head when it is positioned off of that surface.

Pneumatic grain conveyors such as those manufactured and sold by NEUERO as above identified are designed with sufficient power to convey particulate materials along flexible hoses such as hose 44 for distances up to 250 feet. The reduction in pressure in the pneumatic conveyor acquisition conduit 22 will result in a maximum pressure differential between atmospheric and that generated by the air pump at circular rearward material discharge opening 68. Such a pressure, if exerted at the leading edge of the pick-up head, would tend to carry into the pick-up head all manner of deleterious materials including rocks and pebbles, and where spills occur on dirt surfaces, unacceptably large quantities of such dirt.

In so-called vacuum cleaners of the prior art, operating on rugs, bare floor, outside surfaces covered with leaves, etc., the limitation on what was carried into the vacuum cleaner nozzle was limited by having the nozzle facing toward the ground or floor so that it would only pick up those things which were situated directly underneath it. This has, of course, the very large disadvantage in the present context that the equipment and/or the operator had to constantly resist that downward pull toward the surface. This tendency for downward pull has been completely eliminated by providing that the elongated rectangular opening 62 face only forwardly.

As clearly seen in FIGS. 2, 3 and 4, there is a lip 88 forming a part of the leading edge of the pick-up head top plate 60 and there are gusset plates 90, 90 extending integrally forwardly from the side plates 58, 58 and forming parts of the leading edges thereof. These gussets extend from the leading edge of the bottom plate 56 diagonally forwardly and upwardly to support the lip 88. This lip 88 and these gusset plates 90, 90 provide a "shelter" to keep the leading edge of the pick-up head from being "drowned out" by particulate material falling in from above. With this lip in place, the flow into the pick-up head will be over the entire height of the rectangular opening. This results in even individual kernels of corn being picked up from a spill on a rough asphalt street, for example. Because of the shape of the lip and of the diagonal design of the gussets, however, no appreciable downward drag of the head results as is the case with so-called "vacuum cleaners" of the prior art.

There is a substantial problem which has developed in regard to pneumatic grain conveyors such as those sold by NEUERO, VANA INDUSTRIES and CHRISTIANSON SYSTEMS. Some of the suction heads used by others have openings on the order of 4"×8". Because of the power used to convey particulate materials along flexible hoses for several hundred feet, the air rushing into such suction heads has caused the hands and arms of operators to be drawn into such suction heads. Whether the operator's arm is moved into the suction head or whether the suction head and flexible hose climbs up the arm, when it reaches the shoulder, much of the flow is blocked, and the entire force of atmospheric pressure tends to maintain the arm and shoulder inside of and in blocking relation to the suction head. If the operator is working alone, he must drag himself, his arm and shoulder and the suction head and flexible hose around to the grain conveyor itself to turn off the power to release the arm. Such accidents happen primarily when the operator spots a piece of trash in the form of a paper, a stick, dead rodent or bird, or the like, and attempts to clear it from in front of the suction head before it is carried into and through the conveyor.

In pick-up assemblies of the present invention, the use of a pick-up head provided with a forward end opening which has a horizontal dimension at least ten times that of the upright dimension, the chances of such a problem occurring are greatly reduced, if not completely eliminated. This is because the size of the opening is such that, in the usual case, only part of the hand will fit through the opening. The upper and lower leading edges of the bottom plate 56 and the top plate 60 will stop the hand even if the fingers were inadvertently sucked, or placed, into that opening. The blockage of the flow of atmospheric air rushing into the pick-up assembly will not be impeded to any substantial extent by the presence of a hand, and so there will be no problem with the operator simply and quickly withdrawing his hand from in front of the pick-up head.

Although the present invention has been described with reference to preferred embodiments, workers skilled in the art will recognize that changes may be made in form and detail without departing from the spirit and scope of the invention.

What is claimed is:

1. A particulate material pick-up assembly for use with a pneumatic particulate material conveyor having an open-ended air and material acquisition conduit, a material delivery and air dispersing spout means, and means between the acquisition conduit and the spout means for continuously lowering the air pressure in the acquisition conduit to cause ambient air to entrain particulate materials and using air under pressure to cause such materials to discharge from, and such air to be dispersed from, said dispersing spout means continuously;

said pick-up assembly including:
 (a) an imperforate material pick-up head lying on a pick-up assembly longitudinal axis, providing at a forward end thereof a horizontally extending, elongate, generally rectangular and forwardly facing particulate material pick-up forward opening, the forward opening lying in a plane normal to a vertical plane including the pick-up assembly longitudinal axis, the pick-up head also providing at a rearward end thereof a rearward material discharge opening in generally concentric alignment with the pick-up assembly longitudinal axis, said rearward discharge opening lying in a plane normal to said vertical plane;
 (b) a rigid, hollow, tubular pick-up assembly discharge conduit having a first forward end open to, and in concentric, sealing relation with the pick-up head rearward discharge opening and an open second rearward end in concentric alignment with the first end and with the pick-up assembly longitudinal axis;
 (c) a wheel support main frame rigidly supporting said pick-up head and pick-up assembly discharge conduit with respect to each other;
 (d) pick-up assembly wheel means rotatably mounted with respect to the main frame to support the remainder of the pick-up assembly to pivot on a horizontal wheel axis, such wheel axis lying in normal relation to said vertical plane and adjacent a rearward end portion of said discharge conduit;
 (e) a manually manipulable handle for pivoting the pick-up assembly about said horizontal wheel axis and for propelling the assembly on the wheel means;
 (f) handle support means rigidly supporting the handle with respect to the main frame in position rearwardly of and above the wheel axis;
 (g) a ground supported material carrying flexible hose extending between said discharge conduit rearward open end and said material conveyor acquisition conduit, one of the opposite ends of said hose being in sealed concentric relationship to each of these conduits;
 (h) wherein the pick-up head forward opening is defined by the leading edge of a horizontally extending, relatively long, ground-engageable pick-up head bottom plate, by the leading edges of a pair of upright, relatively short, pick-up head side plates extending upwardly from opposite ends of the pick-up head bottom plate, and by the leading edge of a pick-up head top plate, the leading edge of the top plate being in substantially parallel, spaced-apart relation to the leading edge of the bottom plate; and
 (i) wherein the bottom and top leading edges of the pick-up head forward opening are so positioned that there is a flat, substantially vertical plane of material acquisition area open to receive particulate material as the assembly is propelled forwardly on its wheel means into a pile of such material to be conveyed, said area being relatively long in horizontal dimension and relatively short in vertical dimension.

2. The particulate material pick-up assembly of claim 1 wherein:
 (h) the horizontal dimension of the particulate material pick-up opening provided by the pick-up head exceeds that of the upright dimension of that opening by a sufficient dimension so that said upright dimension is small enough to prevent a human limb from accidentally being sucked completely into the pick-up head.

3. The particular material pick-up assembly of claim 2 wherein:
 (i) the ratio of horizontal dimension to upright dimension of the material pick-up opening is such that the upright dimension does not exceed 1.75".

4. The particulate material pick-up assembly of claim 2 wherein:
 (i) said horizontal dimension of the pick-up head forward opening is not less than ten times said upright dimension of that opening.

5. The particulate material pick-up assembly of claim 4 wherein:
 (j) the horizontal dimension of the pick-up head forward opening is about 16" and the upright dimension of that opening is about 1".

6. The particulate material pick-up assembly of claim 4 wherein:
 (j) the horizontal dimension of the pick-up head forward opening is about 24" and the upright dimension of that opening is about 1.5".

7. The assembly of claim 1 wherein:
 (j) the pick-up head bottom plate includes a replaceable wear plate of wear resistant material.

8. The assembly of claim 1, wherein:
 (j) the minimum area available for material flow transverse to the longitudinal axis of the pick-up head and adjacent to the leading edges of that head constitutes a throat, the area of that throat being substantially greater than the area of the open second end of the pick-up assembly discharge conduit transverse to the longitudinal axis of the pick-up head.

9. The assembly of claim 8 wherein:
 (k) the area available for material flow through the throat adjacent its leading edges of the pick-up head is between 125% and 200% of the available area for material flow through the open second end of the pick-up assembly discharge conduit.

10. The assembly of claim 8 wherein:
 (k) the leading edge of the pick-up head top plate is positioned forwardly of the leading edge of the bottom leading edge plate to provide a sheltered area just ahead of said bottom plate to tend to lessen the chance of a material flow blockage occurring near the pick-up head throat due to constriction of air flow into the pick-up head when the entire leading edge of the pick-up head is moved into and is covered over by a pile of particulate material to be conveyed.

11. The assembly of claim 10 wherein:
(l) a pair of gussets, extending forwardly from the pick-up head side plates, have leading edges extending upwardly from the ends of the pick-up head bottom plate to the ends of the pick-up head top plate to tend to support a leading edge portion of the pick-up head top plate.

12. The assembly of claim 1 wherein:
(j) the pick-up assembly discharge conduit is provided with a closeable air access opening therethrough.

13. The assembly of claim 12 wherein:
(k) the effective area of the air access opening in the discharge conduit is variable from a fully opened condition to a closed condition through the instrumentality of a cover plate adjustably mounted on the discharge conduit with respect to said air access opening.

14. The assembly of claim 1 wherein:
(j) the pick-up assembly discharge tube is cylindrical; and
(k) the pick-up head top plate diverges upwardly and rearwardly from the pick-up head bottom plate and the pick-up head side plates converge rearwardly, all four plates converging to smoothly blend into a circular shape defining the rearward discharge opening of the pick-up head.

* * * * *